United States Patent
Lee et al.

(10) Patent No.: US 9,657,815 B2
(45) Date of Patent: May 23, 2017

(54) PLANETARY GEAR TRAIN OF AUTOMATIC TRANSMISSION OF VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 14/941,409

(22) Filed: Nov. 13, 2015

(65) Prior Publication Data

US 2016/0319914 A1     Nov. 3, 2016

(30) Foreign Application Priority Data

Apr. 30, 2015   (KR) .................. 10-2015-0061671

(51) Int. Cl.
*F16H 3/66*     (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC ..... F16H 2200/0069; F16H 2200/2012; F16H 2200/2048
See application file for complete search history.

(56) References Cited

U.S. PATENT DOCUMENTS

| 7,402,119 B2 | 7/2008 | Kamada et al. | |
| 2016/0327132 A1* | 11/2016 | Lee | F16H 3/66 |
| 2016/0356359 A1* | 12/2016 | Lee | F16H 3/66 |
| 2016/0363193 A1* | 12/2016 | Lee | F16H 3/66 |

FOREIGN PATENT DOCUMENTS

| KR | 10-2012-0132021 A | 12/2012 |
| KR | 10-2014-0046240 A | 4/2014 |
| KR | 10-1448789 B1 | 10/2014 |

* cited by examiner

*Primary Examiner* — Derek D Knight
(74) *Attorney, Agent, or Firm* — Morgan Lewis & Bockius LLP

(57) ABSTRACT

A planetary gear train for an automatic transmission may include an input shaft, an output shaft, first to fourth planetary gear sets and seven friction elements disposed to selectively connect the rotation elements with the rotation element and selectively connect the rotation elements with a transmission housing, and wherein the input shaft is continuously connected to the second rotation element, the output shaft is continuously connected to the eleventh rotation element, the first rotation element is continuously connected to the sixth rotation element, the first rotation element is continuously connected to the eighth rotation element, the first rotation element is continuously connected to the tenth rotation element, the fifth rotation element is continuously connected to the ninth rotation element, the output shaft is selectively connected to the third rotation element, and wherein three friction elements are operated for achieving ten forward speed stages and at least one reverse speed stage.

12 Claims, 2 Drawing Sheets

FIG. 2

| | Friction element | | | | | | Gear ratio | Step ratio | Span of shift ratio |
|---|---|---|---|---|---|---|---|---|---|
| | B1 | B2 | B3 | C1 | C2 | C3 | C4 | | | |
| D1 | | | ● | | ● | | ● | 6.278 | 1.63 | 9.455 |
| D2 | | | ● | | ● | ● | | 3.848 | 1.39 | |
| D3 | | | ● | | | ● | ● | 2.761 | 1.45 | |
| D4 | | ● | ● | | | ● | | 1.908 | 1.31 | |
| D5 | | ● | ● | ● | | | | 1.456 | 1.23 | |
| D6 | | ● | | ● | | ● | | 1.185 | 1.19 | |
| D7 | | | | ● | ● | ● | | 1.000 | 1.19 | |
| D8 | ● | | | ● | ● | | | 0.840 | 1.13 | |
| D9 | ● | ● | | ● | | | | 0.741 | 1.12 | |
| D10 | ● | | | ● | | | ● | 0.664 | | |
| REV | ● | | ● | | | | ● | 6.175 | | |

PLANETARY GEAR TRAIN OF AUTOMATIC TRANSMISSION OF VEHICLE

CROSS-REFERENCE TO RELATED APPLICATION

The present application claims priority to and the benefit of Korean Patent Application No. 10-2015-0061671 filed on Apr. 30, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train for an automatic transmission of a vehicle that improves power delivery performance and fuel efficiency as a consequence of achieving ten forward speed stages using a minimum number of constituent elements, enlarging a span of shift ratios, and almost linearly increasing or decreasing step ratios between transmission steps.

Description of Related Art

In recent years, a rise in oil price has caused unlimited competition for enhancing fuel efficiency.

As a result, researches into reduction of weight and enhancement of the fuel efficiency through down-sizing are being conducted in the case of an engine and researches for simultaneously securing operability and fuel efficiency competitiveness through multistages are conducted in the case of an automatic transmission.

However, in the automatic transmission, as a number of transmission steps increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8-speed automated transmissions have tended to be achieved and the research and development of a planetary gear train capable of implementing more transmission steps have also been actively conducted.

Since a span of shift ratios of the recent 8-speed automatic transmission is merely 6.5 to 7.5, the 8-speed automatic transmission has no great effect of improving fuel efficiency.

In addition, since step ratios between transmission step may not be increased or decreased linearly in a case in which a span of shift ratios of the 8-speed automatic transmission is greater than or equal to 9.0, driving efficiency of an engine and drivability of a vehicle may be deteriorated. Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving ten forward speed stages and one reverse speed stage using a minimum number of constituent elements, by enlarging a span of shift ratios, and by almost linearly increasing or decreasing step ratios between transmission steps.

A planetary gear train for an automatic transmission of a vehicle according to an examplary embodiment of the present invention may include an input shaft receiving torque of an engine, an output shaft outputting changed torque, a first planetary gear set including a first, second, and third rotation elements, a second planetary gear set including a fourth, fifth, and sixth rotation elements, a third planetary gear set including a seventh, eighth, and ninth rotation elements, a fourth planetary gear set including tenth, eleventh, twelfth rotation elements and seven friction elements disposed to selectively connect the rotation elements with the rotation element and selectively connect the rotation elements with a transmission housing, and wherein the input shaft is continuously connected to the second rotation element, the output shaft is continuously connected to the eleventh rotation element, the first rotation element is continuously connected to the sixth rotation element, the first rotation element is continuously connected to the eighth rotation element, the first rotation element is continuously connected to the tenth rotation element, the fifth rotation element is continuously connected to the ninth rotation element, the output shaft is selectively connected to the third rotation element, and wherein three friction elements among a seven friction elements are operated for achieving ten forward speed stages and at least one reverse speed stage.

The fifth rotation element may be selectively connected to the transmission housing, the fourth rotation element may be selectively connected to the transmission housing, the twelfth rotation element may be selectively connected to the transmission housing, the output shaft may be selectively connected to the seventh rotation element, the input shaft may be selectively connected to the fifth rotation element, and the input shaft may be selectively connected to the fourth rotation element.

The first, second, and third rotation elements of the first planetary gear set may be a sun gear, a planet carrier, and a ring gear, the fourth, fifth, and sixth rotation elements of the second planetary gear set may be a sun gear, a planet carrier, and a ring gear, the seventh, eighth, and ninth rotation elements of the third planetary gear set may be a sun gear, a planet carrier, and a ring gear, and the tenth, eleventh, and twelfth rotation elements of the fourth planetary gear set may be a sun gear, a planet carrier, and a ring gear.

A planetary gear train for an automatic transmission of a vehicle according to an examplary embodiment of the present invention may include an input shaft receiving torque of an engine, an output shaft outputting changed torque, a first planetary gear set including a first, second, and third rotation elements, a second planetary gear set including a fourth, fifth, and sixth rotation elements, a third planetary gear set including a seventh, eighth, and ninth rotation elements, a fourth planetary gear set including tenth, eleventh, twelfth rotation elements, seven friction elements disposed to selectively connect the rotation elements with the rotation element and selectively connect the rotation elements with a transmission housing, a first rotation shaft including the first, sixth, eighth and tenth rotation elements, a second rotation shaft including the second rotation element and directly connected to the input shaft, a third rotation shaft including the third rotation element, a fourth rotation shaft including the fourth rotation element, and the fourth rotation shaft selectively connected to the input shaft or the transmission housing, a fifth rotation shaft including the fifth and ninth rotation elements, and the fifth rotation shaft selectively connected to the input shaft or the transmission housing, a sixth rotation shaft including the seventh rotation element, a seventh rotation shaft including the eleventh rotation element, and the seventh rotation shaft selectively connected to the third rotation shaft or sixth rotation shaft, and directly connected to the output shaft and an eighth rotation shaft including the twelfth rotation element and selectively connected to the transmission housing.

The first planetary gear set may be a single-pinion planetary gear set, in which the first rotation element is a first sun gear, the second rotation element is a first planet carrier, and the third rotation element is a first ring gear, the second planetary gear set may be a single-pinion planetary gear set, in which the fourth rotation element is a second sun gear, the fifth rotation element is a second planet carrier, and the sixth rotation element is a second ring gear, the third planetary gear set may be a single-pinion planetary gear set, in which the seventh rotation element is a third sun gear, the eighth rotation element is a third planet carrier, and the ninth rotation element is a third ring gear, and the fourth planetary gear set may be a single-pinion planetary gear set, the tenth rotation element is a fourth sun gear, the eleventh rotation element is a fourth planet carrier, and the twelfth rotation element is a fourth ring gear.

The first, second, third, fourth planetary gear sets may be disposed in a sequence of the second, first, third and fourth planetary gear sets from an engine side.

The seven friction elements may include a first clutch selectively connecting the third and seventh rotation shafts, a second clutch selectively connecting the sixth and seventh rotation shafts, a third clutch selectively connecting the input shaft and the fifth rotation shaft, a fourth clutch selectively connecting the input shaft and the fourth rotation shaft, a first brake selectively connecting the fifth rotation shaft and the transmission housing, a second brake selectively connecting the fourth rotation shaft and the transmission housing and a third brake selectively connecting the eighth rotation shaft and the transmission housing.

Shift speed stages may be achieved by selectively operating the seven friction elements, and may include a first forward speed stage achieved by simultaneous operation of the second and fourth clutches and the third brake, a second forward speed stage achieved by simultaneous operation of the second and third clutches and the third brake, a third forward speed stage achieved by simultaneous operation of the third and fourth clutches and the third brake, a fourth forward speed stage achieved by simultaneous operation of the third clutch and the second and the third brakes, a fifth forward speed stage achieved by simultaneous operation of the first clutch and the second and the third brakes, a sixth forward speed stage achieved by simultaneous operation of the first and third clutches and the second brake, a seventh forward speed stage achieved by simultaneous operation of the first, second and third clutches, an eighth forward speed stage achieved by simultaneous operation of the first and second clutches and the first brake, a ninth forward speed stage achieved by simultaneous operation of the first clutch and the first and second brakes, a tenth forward speed stage achieved by simultaneous operation of the first and fourth clutches and the first brake and a reverse speed stage achieved by simultaneous operation of the fourth clutch and the first and third brakes.

A planetary gear train for an automatic transmission of a vehicle according to an examplary embodiment of the present invention may include an input shaft receiving torque of an engine, an output shaft outputting changed torque, a first planetary gear set including a first, second and third rotation elements, a second planetary gear set including a fourth, fifth and sixth rotation elements, a third planetary gear set including a seventh, eighth and ninth rotation elements, a fourth planetary gear set including a tenth, eleventh and twelfth rotation elements, a first rotation shaft including the first sun gear, second ring gear, third planet carrier and fourth sun gear, a second rotation shaft including the first planet carrier and directly connected to the input shaft, a third rotation shaft including the first ring gear, a fourth rotation shaft including the second sun gear and the fourth rotation shaft selectively connected to the input shaft or the transmission housing, a fifth rotation shaft including the second planet carrier and the third ring gear, and selectively connected to the input shaft, a sixth rotation shaft including the third sun gear, a seventh rotation shaft including the fourth planet carrier, selectively connected to the third rotation shaft or the sixth rotation shaft and directly connected to the output shaft, an eighth rotation shaft including the fourth ring gear and selectively connected to the transmission housing and seven friction elements disposed to selectively connect the rotation shaft with the rotation shaft and selectively connect the rotation shafts with the transmission housing. The first, second, third, fourth planetary gear sets may be disposed in a sequence of the second, first, third and fourth planetary gear sets from an engine side.

The seven friction elements may include a first clutch selectively connecting the third and seventh rotation shafts, a second clutch selectively connecting the sixth and seventh rotation shafts, a third clutch selectively connecting the input shaft and the fifth rotation shaft, a fourth clutch selectively connecting the input shaft and the fourth rotation shaft, a first brake selectively connecting the fifth rotation shaft and the transmission housing, a second brake selectively connecting the fourth rotation shaft and the transmission housing and a third brake selectively connecting the eighth rotation shaft and the transmission housing.

Shift speed stages may be achieved by selectively operating the seven friction elements, and may include a first forward speed stage achieved by simultaneous operation of the second and fourth clutches and the third brake, a second forward speed stage achieved by simultaneous operation of the second and third clutches and the third brake, a third forward speed stage achieved by simultaneous operation of the third and fourth clutches and the third brake, a fourth forward speed stage achieved by simultaneous operation of the third clutch and the second and the third brakes, a fifth forward speed stage achieved by simultaneous operation of the first clutch and the second and the third brakes, a sixth forward speed stage achieved by simultaneous operation of the first and third clutches and the second brake, a seventh forward speed stage achieved by simultaneous operation of the first, second and third clutches, an eighth forward speed stage achieved by simultaneous operation of the first and second clutches and the first brake, a ninth forward speed stage achieved by simultaneous operation of the first clutch and the first and second brakes, a tenth forward speed stage achieved by simultaneous operation of the first and fourth clutches and the first brake and a reverse speed stage achieved by simultaneous operation of the fourth clutch and the first and third brakes.

An exemplary embodiment of the present invention may achieve ten forward speed stages and one reverse speed stage by combining four planetary gear sets that are simple planetary gear sets with seven friction elements.

In addition, engine driving efficiency may be maximized by achieving a span of shift ratios to be greater than or equal to 9.0.

In addition, drivability such as acceleration before and after the shift and rhythm of engine speed may be improved by almost linearly increasing or decreasing step ratios between transmission steps.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to the planetary gear train according to the first exemplary embodiment of the present invention.

Figure 1:
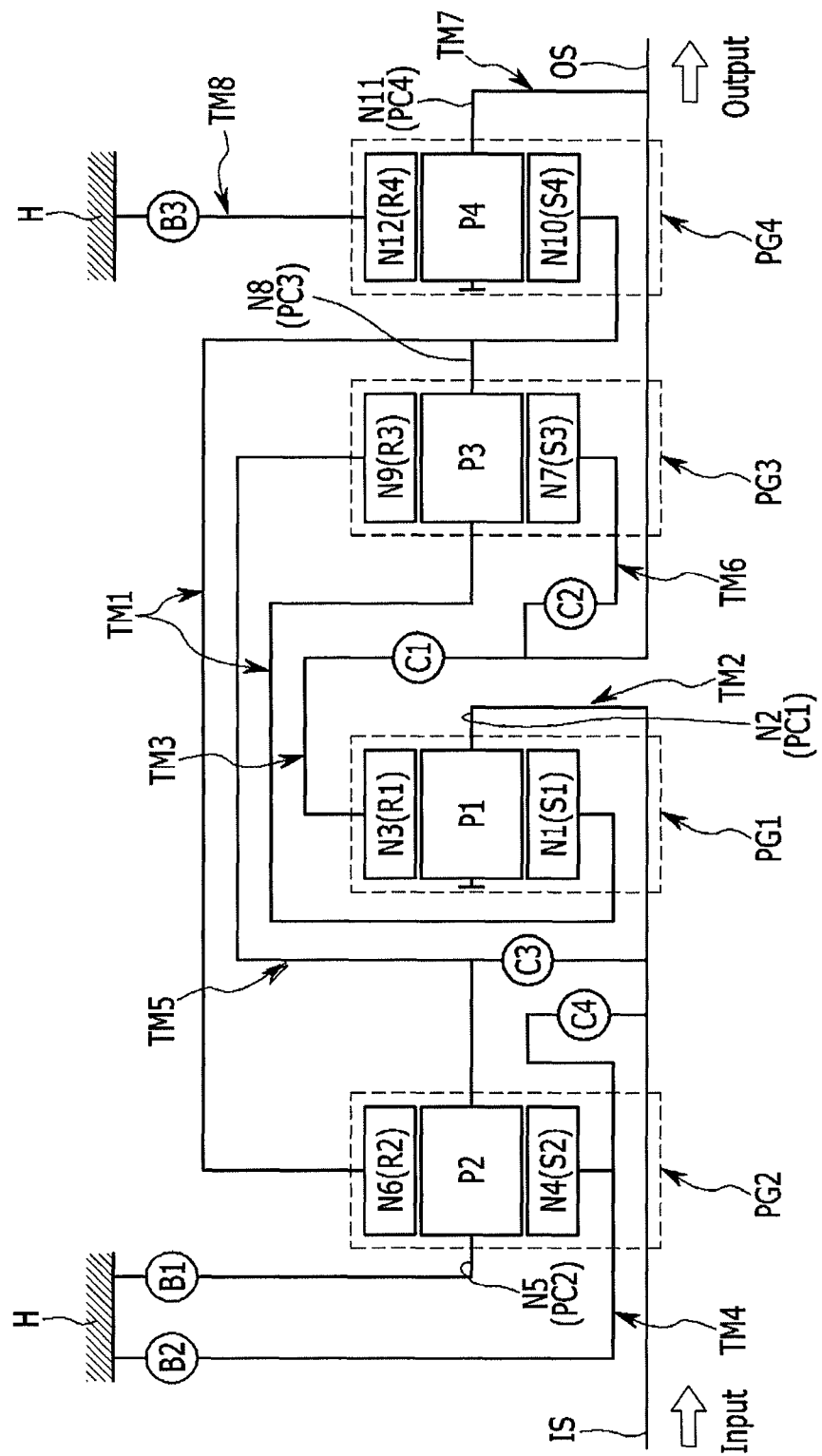
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a planetary gear train according to a first exemplary embodiment of the present invention.

Referring to FIG. 1, the planetary gear train according to the exemplary embodiment of the present invention includes a first, second, third, and fourth planetary gear sets PG1, PG2, PG3, and PG4 disposed on the same axis, and an input shaft IS, an output shaft OS, eight rotation shafts TM1 to TM8 directly connecting to each other respective rotation elements of the first, second, third, and fourth planetary gear sets PG1, PG2, PG3, and PG4, seven friction elements C1 to C4 and B1 to B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the second, first, third, and fourth planetary gear sets PG2, PG1, PG3, and PG4 from an engine side.

The input shaft IS is an input member and rotational power from a crankshaft of an engine is torque-converted through a torque converter to be input into the input shaft IS.

The output shaft OS is an output member, is disposed on the same axis with the input shaft IS, and transfers transmitted driving torque to a driving shaft through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet carrier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

The fourth planetary gear set PG4 as a single-pinion planetary gear set includes a fourth sun gear S4 which is a tenth rotation element N10, a fourth planet carrier PC4 which is an eleventh rotation element N11 that supports a fourth pinion P4 which outer-engages with the fourth sun gear S4 which is the tenth rotation element N10, and a fourth ring gear R4 which is a twelfth rotation element N12 which inner-engages with the fourth pinion P4 as the rotation elements.

In the first, second, third, and fourth planetary gear sets PG1, PG2, PG3, and PG4, the first rotation element N1 is directly connected to the sixth, eighth and tenth rotation elements N6, N8 and N10, the fifth rotation element N5 is directly connected to the ninth rotation element N9 so as to be operated with a total of eight rotation shafts TM1 to TM8.

Configurations of the eight rotation shafts TM1 to TM8 will be described below.

The first rotation shaft TM1 includes the first rotation element N1 (the first sun gear S1), the sixth rotation element N6 (the second ring gear R2), the eighth rotation element N8 (third planet carrier PC3) and the tenth rotation element N10 (the fourth sun gear S40.

The second rotation shaft TM2 includes the second rotation element N2 (the first planet carrier PC1) and is directly connected to the input shaft IS so as to be continuously operated as an input element.

The third rotation shaft TM3 includes the third rotation element N3 (the first ring gear R1).

The fourth rotation shaft TM4 includes the fourth rotation element N4 (the second sun gear S2) and is selectively connected to the input shaft IS or the transmission housing H.

The fifth rotation shaft TM5 includes the fifth rotation element N5 (the second planet carrier PC2) and the ninth rotation element N9 (the third ring gear R3) is selectively connected to the input shaft IS.

The sixth rotation shaft TM6 includes the seventh rotation element N7 (the third sun gear S3).

The seventh rotation shaft TM7 includes the eleventh rotation element N11 (the fourth planet carrier PC4) and is selectively connected to the third rotation shafts TM3 or the sixth fourth rotation shafts TM6, and is directly connected to the output shaft OS so as to be continuously operated as an output element.

The eighth rotation shaft TM8 includes the twelfth rotation element N12 (the fourth ring gear R4) and is selectively connected to the transmission housing H.

In addition, among the rotation shaft TM1 to TM8, four clutches C1, C2, C3, and C4 which are friction elements are disposed at connection portions where the rotation shafts are connected to each other.

In addition, among the rotation shafts TM1 to TM8, three brakes B1, B2 and B3 which are friction elements are disposed at connection portions between any one rotation shaft and the transmission housing H.

The seven friction elements C1 to C4 and B1 to B3 will be described in further detail.

The first clutch C1 is interposed between the third rotation shaft TM3 and the seventh rotation shaft TM7 and selectively connects third rotation shaft TM3 and the seventh rotation shaft TM7.

The second clutch C2 is interposed between the sixth rotation shaft TM6 and the seventh rotation shaft TM7 and selectively connects the sixth rotation shaft TM6 and the seventh rotation shaft TM7.

The third clutch C3 is interposed between the input shaft IS and the fifth rotation shaft TM5 and selectively connects the input shaft IS and the fifth rotation shaft TM5.

The fourth clutch C4 is interposed between the input shaft IS and the fourth rotation shaft TM4 and selectively connects the input shaft IS and the fourth rotation shaft TM4.

The first brake B1 is interposed between the fifth rotation shaft TM5 and the transmission housing H and selectively selective causes the fifth rotation shaft TM5 to be operated as a fixed element.

The second brake B2 is interposed between the fourth rotation shaft TM4 and the transmission housing H and selectively selective causes the fourth rotation shaft TM4 to be operated as a fixed element.

The third brake B3 is interposed between the eighth rotation shaft TM8 and the transmission housing H and selectively selective causes the eighth rotation shaft TM8 to be operated as a fixed element.

The friction elements including the first, second, third, and fourth clutches C1, C2, C3, and C4 and the first, second, and third brakes B1, B2, and B3 may be multi-plate friction elements of a wet type that are operated by hydraulic pressure.

FIG. 2 is an operation chart of friction elements at each speed stage in the planetary gear train according to an exemplary embodiment of the present invention.

As shown in FIG. 2, three friction elements are operated at each speed stage in the planetary gear train according to an exemplary embodiment of the present invention. Shifting processes in the exemplary embodiment of the present invention will be described in further detail.

The second and fourth clutches C2 and C4 and the third brake B3 are simultaneously operated at a first forward speed stage 1ST. In a state that the sixth rotation shaft TM6 is connected to the seventh rotation shaft TM7 by operation of the second clutch C2, the input shaft IS is connected to the fourth rotation shaft TM4 by operation of the fourth clutch C4, and input is made into the second rotation shaft TM2 and the fourth rotation shaft TM4, and the eighth rotation shaft TM8 is operated as the fixed element by operation of the third brake B3. Therefore, the first forward speed stage 1ST is achieved.

The second and third clutches C2 and C3 and the third brake B3 are simultaneously operated at a second forward speed stage 2ND.

In a state that the sixth rotation shaft TM6 is connected to the seventh rotation shaft TM7 by operation of the second clutch C2, the input shaft IS is connected to the fifth rotation shaft TM5 by operation of the third clutch C3 and the input is made into the second rotation shaft TM2 and the fifth rotation shaft TM5, and the eighth rotation shaft TM8 is operated as the fixed element by operation of the third brake B3. Therefore, the second forward speed stage 2ND is achieved.

The third and fourth clutches C3 and C4 and the third brake B3 are simultaneously operated at a third forward speed stage 3RD.

In a state that the input shaft IS is connected to the fifth rotation shaft TM5 by operation of the third clutch C3, the input shaft IS is connected to the fifth rotation shaft TM5 by operation of the fourth clutch C4, and the input is made into the second rotation shaft TM2 and the fourth and the fifth rotation shafts TM4 and TM5, and the eighth rotation shaft TM8 is operated as the fixed element by operation of the third brake B3. Therefore, the third forward speed stage 3RD is achieved.

The third clutch C3 and the second and third brakes B2 and B3 are simultaneously operated at a fourth forward speed stage 4TH.

In a state that the input shaft IS is connected to the fifth rotation shaft TM5 by operation of the third clutch C3 and the input is made into the second rotation shaft TM2 and the fifth rotation shaft TM5, and the fourth and eighth rotation shafts TM4 and TM8 are operated as the fixed element by operation of the second and third brakes B2 and B3. Therefore, the fourth forward speed stage 4TH is achieved.

The first clutch C1 and the second and third brakes B2 and B3 are simultaneously operated at a fifth forward speed stage 5TH. In a state that the third rotation shaft TM3 is connected to the seventh rotation shaft TM7 by operation of the first clutch C1 and the input is made into the second rotation shaft TM2, and the fourth and the eighth rotation shafts TM4 and TM8 are operated as the fixed element by operation of the second and third brakes B2 and B3. Therefore, the fifth forward speed stage 5TH is achieved.

The first and third clutches C1 and C3 and the second brake B2 are simultaneously operated at a sixth forward speed stage 6TH.

In a state that the third rotation shaft TM3 is connected to the seventh rotation shaft TM7 by operation of the first clutch C1, the input shaft IS is connected to the fifth rotation shaft TM5 by operation of the third clutch C3 and the input is made into the second rotation shaft TM2 and the fifth rotation shaft TM5, and the fifth rotation shaft TM5 is operated as the fixed element by operation of the second brake B2. Therefore, the sixth forward speed stage 6TH is achieved.

The first, second and third clutches C1, C2, and C3 are simultaneously operated at a seventh forward speed stage 7TH.

In a state that the third rotation shaft TM3 is connected to the seventh rotation shaft TM7 by operation of the first clutch C1, the sixth rotation shaft TM6 is connected to the seventh rotation shaft TM7 by operation of the second clutch C2, the input shaft IS is connected to the fifth rotation shaft TM5 by operation of the third clutch C3. Therefore, the seventh forward speed stage 7TH for just outputting the input is achieved as all of the first, second, third, and fourth planetary gear sets PG1, PG2, PG3, and PG4 are integrally rotate at the same speed.

The first and second clutches C1 and C2 and the first brake B1 are simultaneously operated at an eighth forward speed stage 8TH.

In a state that the third rotation shaft TM3 is connected to the seventh rotation shaft TM7 by operation of the first clutch C1, the sixth rotation shaft TM6 is connected to the seventh rotation shaft TM7 by operation of the second clutch C2 and the input is made into the second rotation shaft TM2 and the fifth rotation shaft TM5 is operated as the fixed element by operation of the first brake B1. Therefore, the eighth forward speed stage 8TH is achieved.

The first clutch C1 and the first and second brakes B1 and B2 are simultaneously operated at a ninth forward speed stage 9TH.

In a state that the third rotation shaft TM3 is connected to the seventh rotation shaft TM7 by operation of the first clutch C1 and the input is made into the second rotation shaft TM2 and the fifth and fourth rotation shafts TM5 and TM4 are operated as the fixed elements by operation of the first and second brakes B1 and B2. Therefore, the ninth forward speed stage 9TH is achieved.

The first and fourth clutches C1 and C4 and the first brake B1 are simultaneously operated at a tenth forward speed stage 10TH.

In a state that the third rotation shaft TM3 is connected to the seventh rotation shaft TM7 by operation of the first clutch C1, the input shaft IS is connected to the fourth rotation shaft TM4 by operation of the fourth clutch C4 and the input is made into the second rotation shaft TM2 and the fourth rotation shaft TM4 and the fifth rotation shaft TM5 is operated as the fixed element by operation of the first brake B1. Therefore, the tenth forward speed stage 10TH is achieved.

The fourth clutch C4 and the first and third brakes B1 and B3 are simultaneously operated at a reverse speed stage REV.

In a state that the input shaft IS is connected to the fourth rotation shaft TM4 by operation of the fourth clutch C4 and the input is made into the second rotation shaft TM2 and the fourth rotation shaft TM4 and the fifth rotation shaft TM5 and the eighth rotation shaft TM8 are operated as the fixed elements by operation of the first and third brakes B1 and B3. Therefore, the reverse speed stage REV is achieved.

The planetary gear train according to an exemplary embodiment of the present invention may achieve ten forward speed stages and one reverse speed stage by control of four planetary gear sets PG1, PG2, PG3, and PG4 with four clutches C1, C2, C3, and C4, and three brakes B1, B2 and B3.

In addition, engine driving efficiency may be maximized by achieving a span of shift ratios to be greater than or equal to 9.0.

In addition, drivability such as acceleration before and after the shift and rhythm of engine speed may be improved by almost linearly increasing or decreasing step ratios between transmission steps.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train for an automatic transmission of a vehicle, comprising:
    an input shaft receiving torque of an engine;
    an output shaft outputting changed torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element; and
    seven friction elements disposed to selectively connect the rotation elements with the rotation element and selectively connect the rotation elements with a transmission housing, and
    wherein the input shaft is continuously connected to the second rotation element,
    the output shaft is continuously connected to the eleventh rotation element,
    the first rotation element is continuously connected to the sixth rotation element,
    the first rotation element is continuously connected to the eighth rotation element,
    the first rotation element is continuously connected to the tenth rotation element,
    the fifth rotation element is continuously connected to the ninth rotation element,
    the output shaft is selectively connected to the third rotation element, and
    wherein three friction elements among the seven friction elements are operated for achieving ten forward speed stages and at least one reverse speed stage.

2. The planetary gear train of claim 1, wherein
    the fifth rotation element is selectively connected to the transmission housing, the fourth rotation element is selectively connected to the transmission housing, the twelfth rotation element is selectively connected to the transmission housing, the output shaft is selectively connected to the seventh rotation element, the input shaft is selectively connected to the fifth rotation element, and the input shaft is selectively connected to the fourth rotation element.

3. The planetary gear train of claim 1, wherein the first rotation element, the second rotation element, and the third rotation element of the first planetary gear set are a sun gear, a planet carrier, and a ring gear, the fourth rotation element, the fifth rotation element, and the sixth rotation element of the second planetary gear set are a sun gear, a planet carrier, and a ring gear, the seventh rotation element, the eighth rotation element, and the ninth rotation element of the third planetary gear set are a sun gear, a planet carrier, and a ring gear, and the tenth rotation element, the eleventh rotation element, and the twelfth rotation element of the fourth planetary gear set are a sun gear, a planet carrier, and a ring gear.

4. A planetary gear train for an automatic transmission of a vehicle, comprising:

an input shaft receiving torque of an engine;

an output shaft outputting changed torque;

a first planetary gear set including a first rotation element, a second rotation element, and a third rotation element;

a second planetary gear set including a fourth rotation element, a fifth rotation element, and a sixth rotation element;

a third planetary gear set including a seventh rotation element, an eighth rotation element, and a ninth rotation element;

a fourth planetary gear set including a tenth rotation element, an eleventh rotation element, and a twelfth rotation element;

seven friction elements disposed to selectively connect the rotation elements with the rotation element and selectively connect the rotation elements with a transmission housing;

a first rotation shaft including the first, sixth, eighth and tenth rotation elements;

a second rotation shaft including the second rotation element and directly connected to the input shaft;

a third rotation shaft including the third rotation element;

a fourth rotation shaft including the fourth rotation element, and the fourth rotation shaft selectively connected to the input shaft or the transmission housing;

a fifth rotation shaft including the fifth and ninth rotation elements, and the fifth rotation shaft selectively connected to the input shaft or the transmission housing;

a sixth rotation shaft including the seventh rotation element;

a seventh rotation shaft including the eleventh rotation element, and the seventh rotation shaft selectively connected to the third rotation shaft or sixth rotation shaft, and directly connected to the output shaft; and an eighth rotation shaft including the twelfth rotation element and selectively connected to the transmission housing.

5. The planetary gear train of claim 4, wherein the first planetary gear set is a single-pinion planetary gear set, in which the first rotation element is a first sun gear, the second rotation element is a first planet carrier, and the third rotation element is a first ring gear, the second planetary gear set is a single-pinion planetary gear set, in which the fourth rotation element is a second sun gear, the fifth rotation element is a second planet carrier, and the sixth rotation element is a second ring gear, the third planetary gear set is a single-pinion planetary gear set, in which the seventh rotation element is a third sun gear, the eighth rotation element is a third planet carrier, and the ninth rotation element is a third ring gear, and the fourth planetary gear set is a single-pinion planetary gear set, the tenth rotation element is a fourth sun gear, the eleventh rotation element is a fourth planet carrier, and the twelfth rotation element is a fourth ring gear.

6. The planetary gear train of claim 5, wherein the first, second, third, fourth planetary gear sets are disposed in a sequence of the second, first, third and fourth planetary gear sets from an engine side.

7. The planetary gear train of claim 4, wherein the seven friction elements comprise:

a first clutch selectively connecting the third and seventh rotation shafts;

a second clutch selectively connecting the sixth and seventh rotation shafts;

a third clutch selectively connecting the input shaft and the fifth rotation shaft;

a fourth clutch selectively connecting the input shaft and the fourth rotation shaft;

a first brake selectively connecting the fifth rotation shaft and the transmission housing;

a second brake selectively connecting the fourth rotation shaft and the transmission housing; and a third brake selectively connecting the eighth rotation shaft and the transmission housing.

8. The planetary gear train of claim 7, wherein shift speed stages are achieved by selectively operating the seven friction elements, and comprise:

a first forward speed stage achieved by simultaneous operation of the second and fourth clutches and the third brake;

a second forward speed stage achieved by simultaneous operation of the second and third clutches and the third brake;

a third forward speed stage achieved by simultaneous operation of the third and fourth clutches and the third brake;

a fourth forward speed stage achieved by simultaneous operation of the third clutch and the second and the third brakes;

a fifth forward speed stage achieved by simultaneous operation of the first clutch and the second and the third brakes;

a sixth forward speed stage achieved by simultaneous operation of the first and third clutches and the second brake;

a seventh forward speed stage achieved by simultaneous operation of the first, second and third clutches;

an eighth forward speed stage achieved by simultaneous operation of the first and second clutches and the first brake;

a ninth forward speed stage achieved by simultaneous operation of the first clutch and the first and second brakes;

a tenth forward speed stage achieved by simultaneous operation of the first and fourth clutches and the first brake; and a reverse speed stage achieved by simultaneous operation of the fourth clutch and the first and third brakes.

9. A planetary gear train for an automatic transmission of a vehicle, comprising:

an input shaft receiving torque of an engine;

an output shaft outputting changed torque;

a first planetary gear set including a first, second and third rotation elements;

a second planetary gear set including a fourth, fifth and sixth rotation elements;

a third planetary gear set including a seventh, eighth and ninth rotation elements;

a fourth planetary gear set including a tenth, eleventh and twelfth rotation elements;

a first rotation shaft including the first sun gear, second ring gear, third planet carrier and fourth sun gear;

a second rotation shaft including the first planet carrier and directly connected to the input shaft;

a third rotation shaft including the first ring gear;

a fourth rotation shaft including the second sun gear and the fourth rotation shaft selectively connected to the input shaft or the transmission housing;

a fifth rotation shaft including the second planet carrier and the third ring gear, and selectively connected to the input shaft;

a sixth rotation shaft including the third sun gear;

a seventh rotation shaft including the fourth planet carrier, selectively connected to the third rotation shaft or the sixth rotation shaft and directly connected to the output shaft;

an eighth rotation shaft including the fourth ring gear and selectively connected to the transmission housing; and seven friction elements disposed to selectively connect the rotation shaft with the rotation shaft and selectively connect the rotation shafts with the transmission housing.

10. The planetary gear train of claim 9, wherein the first, second, third, fourth planetary gear sets are disposed in a sequence of the second, first, third and fourth planetary gear sets from an engine side.

11. The planetary gear train of claim 9, the seven friction elements comprise:

a first clutch selectively connecting the third and seventh rotation shafts;

a second clutch selectively connecting the sixth and seventh rotation shafts;

a third clutch selectively connecting the input shaft and the fifth rotation shaft;

a fourth clutch selectively connecting the input shaft and the fourth rotation shaft;

a first brake selectively connecting the fifth rotation shaft and the transmission housing;

a second brake selectively connecting the fourth rotation shaft and the transmission housing; and a third brake selectively connecting the eighth rotation shaft and the transmission housing.

12. The planetary gear train of claim 11, wherein shift speed stages are achieved by selectively operating the seven friction elements, and comprise:

a first forward speed stage achieved by simultaneous operation of the second and fourth clutches and the third brake;

a second forward speed stage achieved by simultaneous operation of the second and third clutches and the third brake;

a third forward speed stage achieved by simultaneous operation of the third and fourth clutches and the third brake;

a fourth forward speed stage achieved by simultaneous operation of the third clutch and the second and the third brakes;

a fifth forward speed stage achieved by simultaneous operation of the first clutch and the second and the third brakes;

a sixth forward speed stage achieved by simultaneous operation of the first and third clutches and the second brake;

a seventh forward speed stage achieved by simultaneous operation of the first, second and third clutches;

an eighth forward speed stage achieved by simultaneous operation of the first and second clutches and the first brake;

a ninth forward speed stage achieved by simultaneous operation of the first clutch and the first and second brakes;

a tenth forward speed stage achieved by simultaneous operation of the first and fourth clutches and the first brake; and a reverse speed stage achieved by simultaneous operation of the fourth clutch and the first and third brakes.

* * * * *